(12) United States Patent
Stanfield

(10) Patent No.: US 6,789,982 B2
(45) Date of Patent: Sep. 14, 2004

(54) TIRE RASP BLADE AND METHOD

(75) Inventor: Charles K. Stanfield, Crete, IL (US)

(73) Assignee: B&J Manufacturing Company, Glenwood, IL (US)

( * ) Notice: Subject to any disclaimer, the term of this patent is extended or adjusted under 35 U.S.C. 154(b) by 0 days.

(21) Appl. No.: 10/241,165

(22) Filed: Sep. 11, 2002

(65) Prior Publication Data
US 2004/0047696 A1 Mar. 11, 2004

(51) Int. Cl.[7] ............................................... B23B 7/100
(52) U.S. Cl. ................... 407/29.1; 407/49.14
(58) Field of Search ..................... 407/24.1, 29.13, 407/29.14

(56) References Cited

U.S. PATENT DOCUMENTS

| | | | | |
|---|---|---|---|---|
| 4,012,819 A | * | 3/1977 | Willinger | 407/29.12 |
| 4,021,899 A | * | 5/1977 | Jensen | 407/29.12 |
| 6,554,547 B1 | * | 4/2003 | Collins | 407/29.1 |

* cited by examiner

*Primary Examiner*—Willmon Fridie, Jr.
(74) *Attorney, Agent, or Firm*—Emrich & Dithmar LLC

(57) ABSTRACT

A rasp blade includes a mounting aperture having at least two aperture segments which are laterally spaced and communicate with each other. Each aperture segment may independently secure the blade on a mounting pin. Alternate blades are mounted using different aperture segments to fix adjacent blades in laterally offset positions, thereby staggering the teeth in adjacent blades.

10 Claims, 4 Drawing Sheets

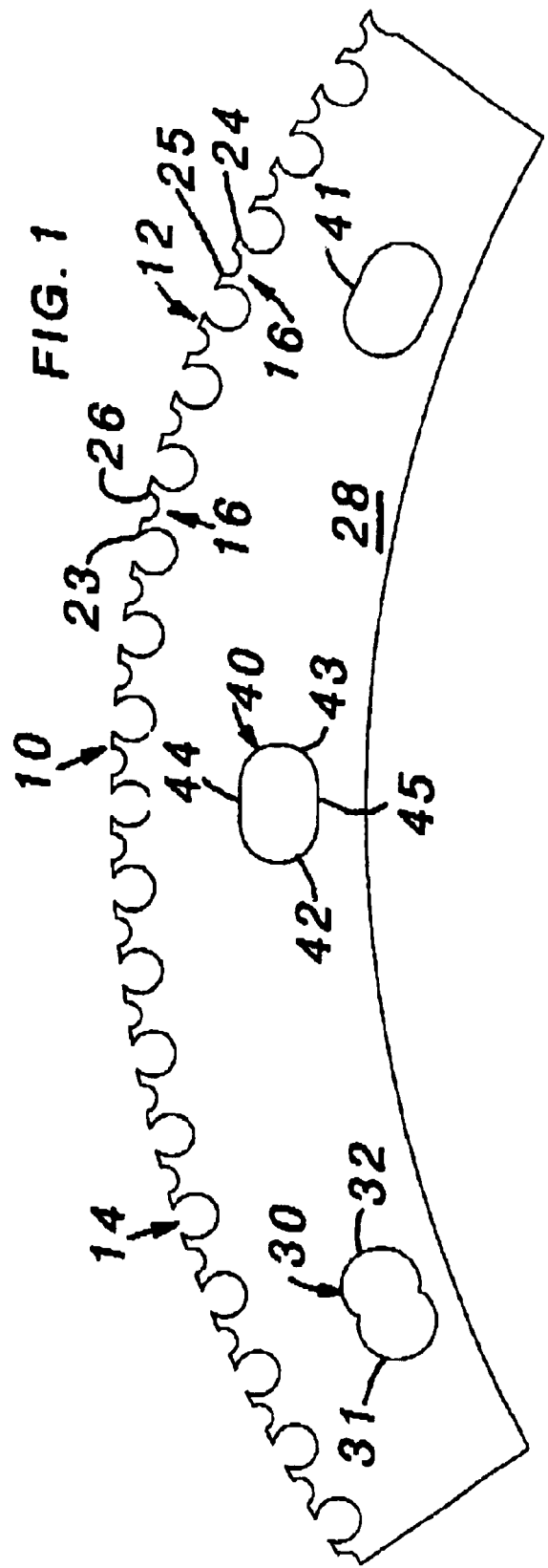

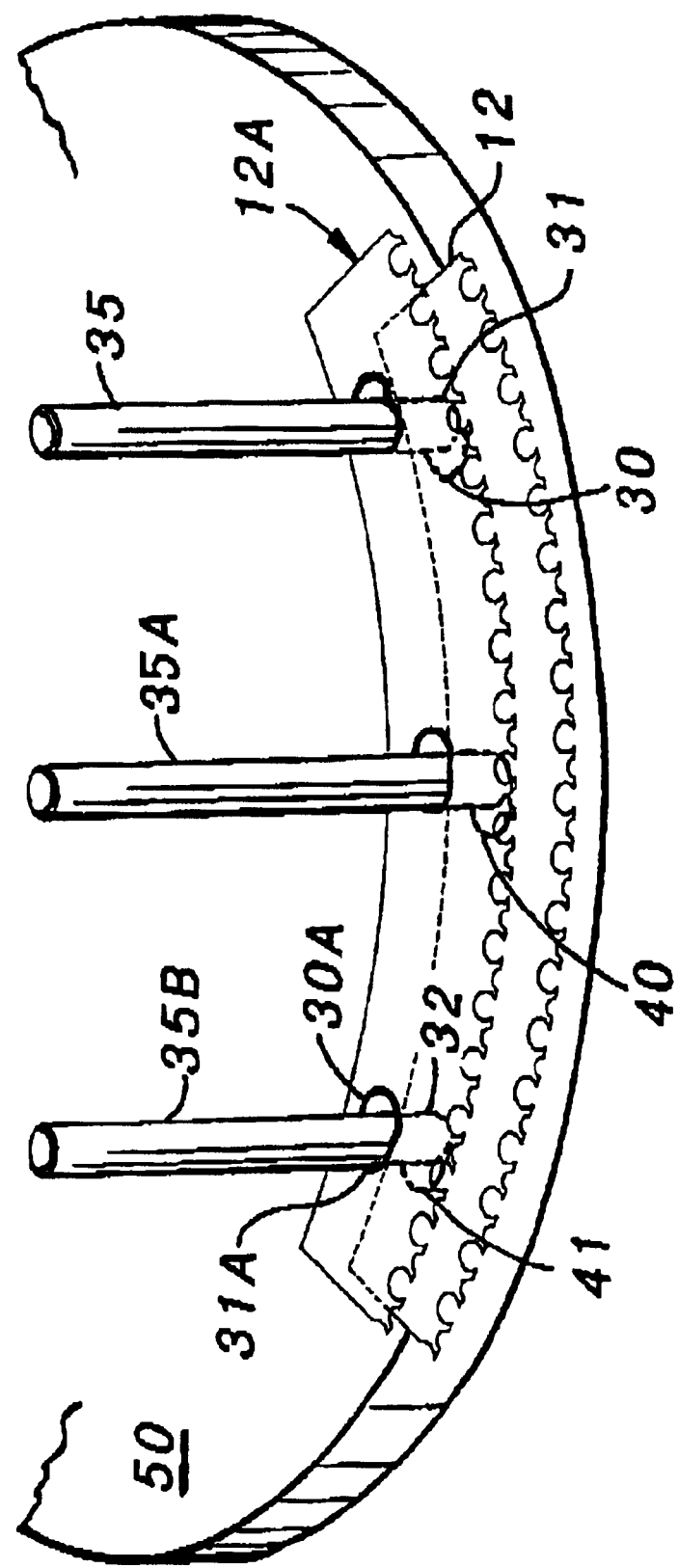

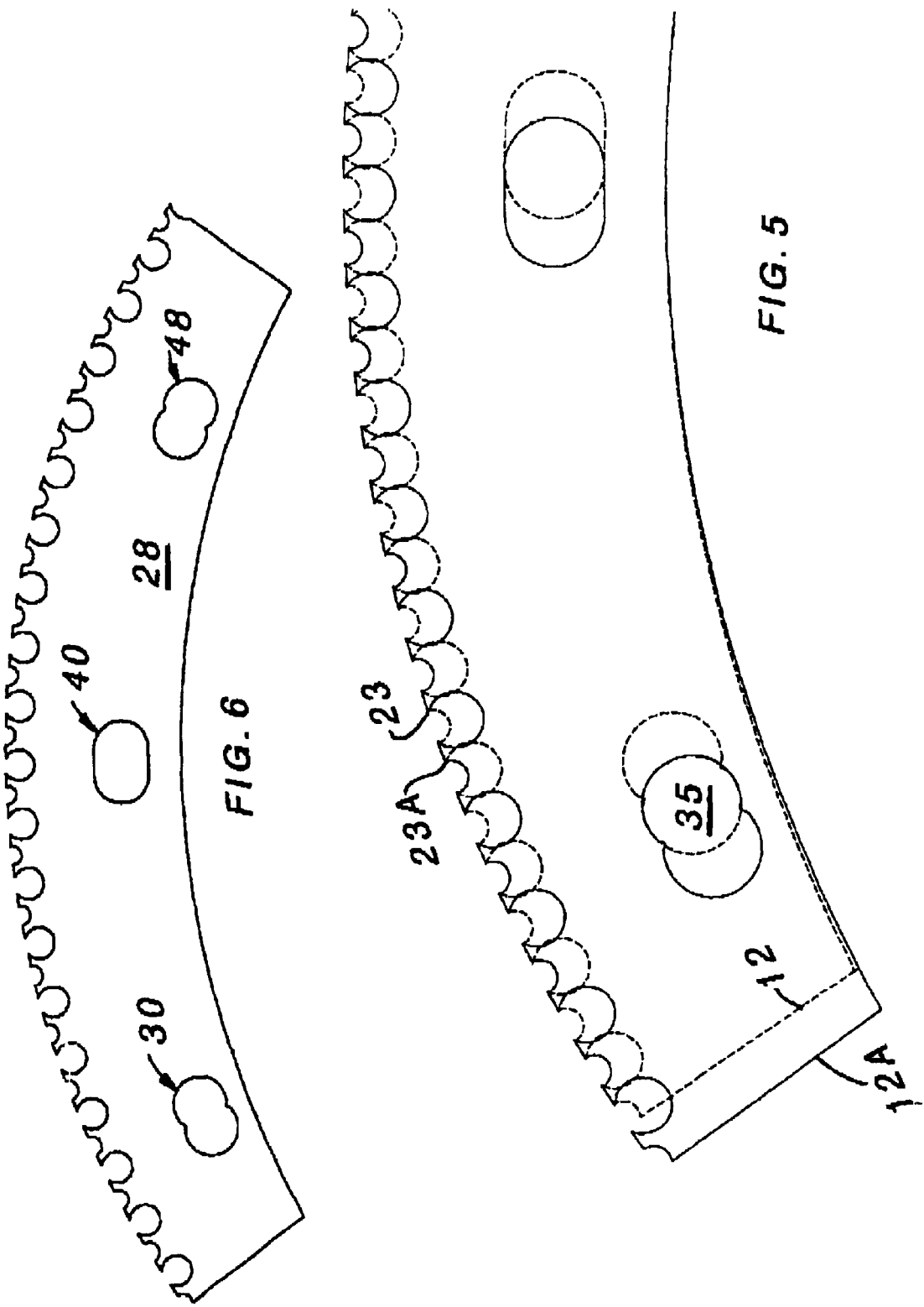

TIRE RASP BLADE AND METHOD

FIELD OF THE INVENTION

The present invention is in the field of tire retreading apparatus, and relates to improvements in both an apparatus and method used for retreading tires. In particular, the invention relates to rasp blades, and an improved assembly and method of use of such blades on tire rasp hubs for buffing away the tread on worn tires.

BACKGROUND OF THE INVENTION

The conventional process by which tire casings are retreaded is to buff away the worn tread, repair any damage that may be required in the casing after buffing, bond a new tread to the casing by a selected vulcanizing process, and then cure the rubber so as to harden and shape it into the desired tread design.

In order to buff and remove the worn tread, the tire casing is mounted on a buffing machine and inflated. A hub assembly, comprising a hub core having a large number of toothed rasp blades mounted thereon, is then rapidly rotated such as on a motor driven shaft, and the peripheral surface of the casing bearing the worn tread is forced against the rotating rasp blades to loosen, tear and grind off the excess rubber and roughen the remaining surface sufficiently so that the buffed surface of the casing can form a sufficient bond with the new replacement rubber tread in the vulcanizing process. Each tire size has a predetermined crown width, profile and radius and the casing must be buffed to the particular shape, size and texture to receive a new tread that ensures proper tread-to-road contact. Buffing of the worn tread is, therefore, a critically important operation of the retreading process affecting the quality, performance and safety of the retreaded tire.

Rasp blades of the prior art comprise numerous configurations and shapes, with a preferred type having teeth of essentially dove-tail shape projecting from the outer working edge. Individual teeth have a notch cut out from the center of the periphery or working edge of the tooth to form a series of substantially "Y" (or dove-tail) shaped teeth defined by cutouts of partly circular shape. The notch formed in each tooth divides it into halves. Each half of a given tooth is offset to opposite sides of the plane in which the blade lies, thus creating a primary cutting edge to one side of the blade body followed by a laterally spaced buffing edge for each tooth. As the rasp hub is rotated, the primary cutting edge and the buffing edge prepare the surface of the casing to a texture necessary and desirable for bonding to a new rubber tread.

A typical tire buffing hub assembly which includes rasp blades has the form of a hub defined by interconnected front and back cylindrical end plates having mounted there between arcuate or quadrant-shaped rasp blades stacked in four (or more) separate arrays around the perimeter of the hub. Each rasp blade of any one stack is separated from adjacent blades of the stack by spacers, the stack being secured in position between the end plates by support pins. The hub assembly is mounted on a drive shaft, and a The hub assembly is mounted on a drive shaft, and a bolt holds the end plates together, sandwiching the rasp blades, thus allowing for dismantling of the hub for purposes of blade replacement, such as when the teeth become worn or are broken. The stacks of blades may be inclined relative to a plane perpendicular to the axis of rotation of the hub; and the stacks may be alternated in this inclination or offset. That is, the blades of one stack may be inclined toward one end of the hub and an adjacent stack inclined toward the opposite end of the hub.

Many blades of various configurations and shapes used on tire rasp hubs, with all of the blades in a given hub having generally the same shape, size and distribution of teeth. For instance, any two adjacent blades in a stack may have identical secondary and tertiary configurations and the teeth of one blade may be substantially laterally aligned with the teeth of an adjacent blade. This arrangement is typically facilitated by using identical blades throughout and fixing each blade of a stack in a "name down" (or "face down") direction, whereby the manufacturer's name appears on only one of the two opposed faces of the blade and indicates the direction in which the name side of all blades of that stack are to face. Where this technique is not employed, some other means for facilitating the stacking of the blades in a commonly aligned direction is used.

All of the teeth on each blade are symmetrically disposed along the working edge of the blade. For instance, the tooth (or partial tooth) closest to one end of the blade is located the same distance from that end as the tooth closest to the other end is located from that other end. Thus, the blades and configuration of teeth remain the same even if the blade is reversed and the "name" sides of adjacent blades face each other.

There have been suggestions to "stagger" the teeth of adjacent blades to provide an improved buffed surface for better adhesion to the tread after treating the tread-receiving outer surface of the casing. By using a tire rasp assembled with staggered teeth according to this invention, worn tire tread may be buffed away from a casing at a rapid rate while developing minimum amount of heat that might otherwise adversely affect the texture of the buffed surface needed for suitable retreading. Such suggestions include U.S. Pat. No. 3,102,325 of Hemmeter, and Australian Patent Application No. 58,291/99 of Anthony Collins. However, both suggested approaches requires "back to back" stacking of the blades in loading a hub.

SUMMARY OF THE INVENTION

The present invention is directed to a rasp blade for a tire buffing machine adapted to be mounted on a conventional rotary hub which typically includes disc-shaped end mounting plates and a plurality of cylindrical mounting pins (normally 2 or 3 pins) pressed into one of the end plates. The mounting pins extend parallel to the axis of rotation of the hub and serve to mount the blades between the discs to form a rasp assembly which is then mounted to a driven shaft.

Each blade includes a curved blade body having mounting apertures adapted to be received on the mounting pins, and an outer, working edge on which the teeth are formed. The entire blade is formed from a stamping which makes it economical to manufacture. After the blade is stamped out, forward and rear segments of each individual tooth are displaced in opposite lateral directions relative to the plane of the blade. The teeth are arranged on the working edge of the blade in side-by-side relation and in uniform pitch (i.e. spacing).

The body of the blade includes a mounting aperture for each pin located on the one end disc of the hub. Two or three mounting pins may be used, and the blades have a corresponding number of mounting apertures. For purposes of illustration, it will be assumed that three such mounting pins are used.

The body of the blade thus includes three mounting apertures. According to the present invention, one or two of the mounting apertures are duplex mounting apertures. This means that the same opening has two separate locations for receiving one of the mounting pins. The two locations are offset laterally by an amount related to the pitch of the teeth such that when the blades are mounted all "face up" (or face down) on the hub, the cutting teeth of one blade are staggered relative to the cutting teeth of adjacent blades when viewed from the side so long as the mounting pin (or pins) is received in alternate ones of the openings of the duplex mounting aperture.

One advantage of the present invention is that all of the blades in a given quadrant of the hub can be mounted in the same orientation. This permits the operator to conveniently load blades in a rotary manner (that is, assembling all blades of a given rank in the assembly) or to load each quadrant of blades before going to the next quadrant, according to the preference of the operator. The invention also eliminates "flipping" of the blades when loading a hub, as required in systems in which the blades are mounted in "back-to-back" relation. Thus, the present invention reduces the amount of handling of the blades during assembly by the operator. Staggering the teeth is believed to produce more favorable conditions of buffing and a surface which forms an improved bond with the tread. In addition, staggering the teeth extends the life of the blade.

There are other features and advantages of the present invention which will be apparent to persons skilled in the art from the following detailed description of a preferred embodiment accompanied by the attached drawing wherein identical reference numerals are used to refer to like parts in the various views.

BRIEF DESCRIPTION OF THE DRAWINGS

FIG. 1 is an elevational view of a rasp blade for a tire buffing machine constructed according to the present invention;

FIG. 4 is a perspective view of a portion of a hub end plate including mounting pins on which two adjacent blades constructed according to the present invention are mounted;

FIG. 5 is an elevational view of fragmentary left sides of two rasp blades constructed according to the present invention in staggered relation; and FIG. 6 is an elevational view of a rasp blade incorporating the present invention and including two duplex mounting apertures.

DETAILED DESCRIPTION OF THE PREFERRED EMBODIMENTS

Figure 3:
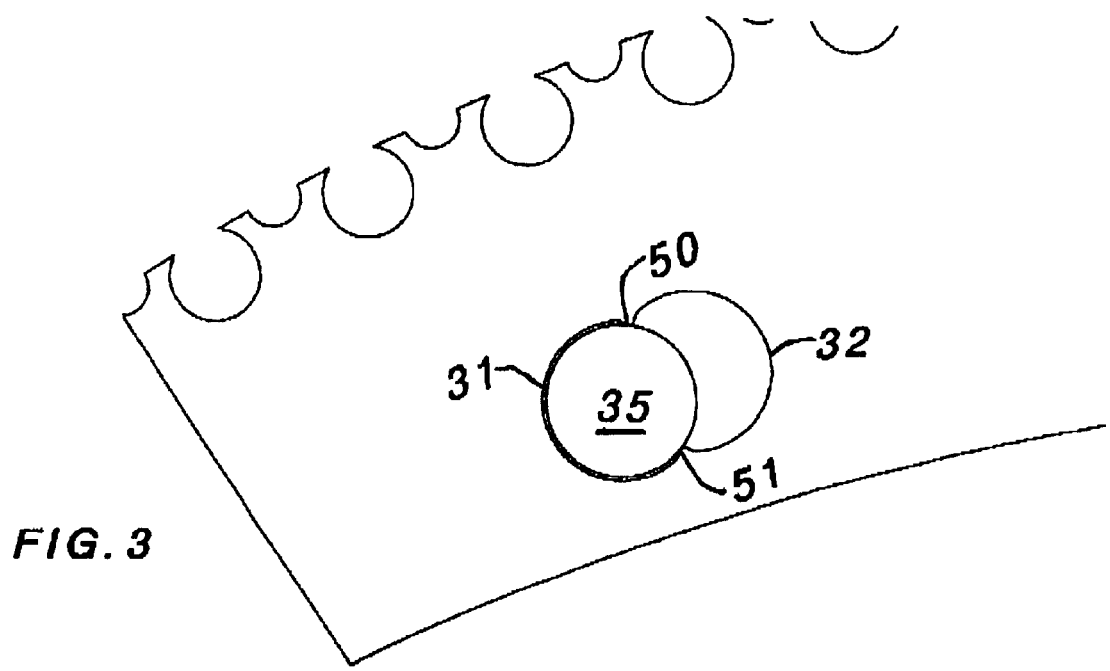
FIG. 3 is a view similar to FIG. 2 with the duplex opening modified slightly to increase the capture of the blade.

Referring first to FIG. 1, reference numeral 10 generally designates a rasp blade formed in a quadrant or arcuate shape. That is, the blade extends around approximately one quarter of a cylindrical hub assembly of a buffing machine (described later in connection with FIGS. 4 and 5). The blades 10 are stamped from sheet metal, and therefore are flat and extend in a plane generally perpendicular to the axis of rotation of the hub, although they may be slightly skewed (by approximately 3°–5°, for example) relative to a plane perpendicular to the rotational axis of the hub, as is known in the art. That is, alternate stacks of blades may be skewed in opposing directions—that is, one stack having its blades angled in one direction relative to a plane perpendicular to the axis of rotation and an adjacent stack having its blades angled toward the other direction relative to the same plane.

Located on a working edge of the blade 10 are a plurality of teeth generally designated 12 which are formed during the stamping process. The method of manufacturing and the form of the blade 10 (except for the duplex mounting aperture to be described), including the shape of the teeth 12 are known, as exemplified in U.S. Pat. No. 3,082,506.

The set of teeth 12 are uniformly distributed along the working edge, generally designated 14, and have a predetermined, constant pitch. As used herein, "pitch" is the distance from the leading edge of one tooth to the leading edge of the next adjacent tooth on the same blade.

Figure 2:
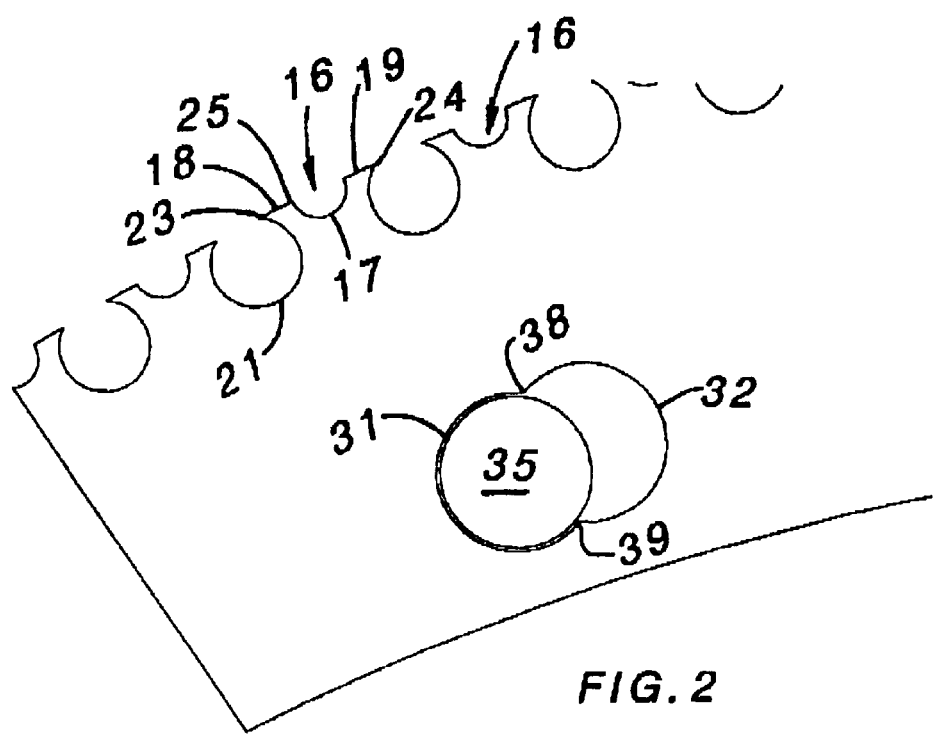
FIG. 2 is a close-up fragmentary view of the left side of the rasp blade of FIG. 1 assembled to a mounting pin of a hub in the "left" position.

The teeth 12 are shaped in the form of a "dove tail" with a central notch. For example, the tooth designated 16 in FIG. 2 has a central notch 17 which separates a first tooth section 18 and a second tooth section 19. Adjacent teeth are separated by a larger circular opening 21. As seen in FIG. 2, the left edge of the section 18 forms an acute angle, thus forming a cutting edge 23. Similarly, the section 19 forms a cutting edge 24 facing a direction opposite the cutting edge 23. Moreover, the right edge 25 of the left tooth section 18 of the tooth 16 has a buffing edge 25, and the left edge 26 of the right section 19 forms a similar buffing edge facing the opposite direction.

Each of the teeth 16 is twisted so that one individual section (for example, section 18 in the example of FIG. 2) formed by the notch 17 and the opening 21 is displaced to one side of the body 28 of the blade (for example, out of the plane of the page) in FIG. 2); and the other tooth section 19 is displaced to the other side of the blade body 28 (into the plane of the page), thus providing two individual tooth sections 18, 19 displaced to opposite sides of the blade body 28.

When the blade is rotated counter-clockwise as seen in FIGS. 1 and 2, the cutting edge 23 and the buffing edge 26 of the tooth cooperate to prepare the surface of the tire casing being worked on. If the blade is driven in the opposite direction, namely, clockwise as viewed in FIG. 1, the cutting edge 24 of the tooth section 19 and the buffing edge 25 of the tooth section 18 cooperate in preparing the surface of the tire.

Although not shown in the drawing, a manufacturer of rasp blades typically imprints its trademark or identification on one side of the blade. It is not necessary to the practice of the invention that one side of the blade be marked, but it may help to understand the operation of assembling blades to a hub if it is assumed that one side is marked or is the "face" side and the other is the back side.

As indicated above, it has already been suggested in the prior art to "stagger" the teeth of blades mounted on a hub. In this connection, the word "stagger" means that the teeth on adjacent blades mounted on the hub are offset from one another when viewed from the side—that is, the direction in which the observer looks when viewing FIGS. 1 and 2. This is parallel to the axis of rotation. However, the above-referenced Collins prior art suggests an arrangement in which the mounting apertures in the blade body (at least the two apertures to the side of the center) are located in offset positions relative to the center of the blade so that when the blades are mounted "back-to-back", the cutting edges of teeth on adjacent blades are offset. Mounting blades back-to-back require that every other blade be flipped, leading to errors and increased handling, resulting in additional mounting time.

The present invention accomplishes a similar purpose in staggering the teeth, but it accomplishes this purpose by means of a mounting aperture such as the aperture designated 30 in FIG. 1 in the form of a "figure 8" and which is sometimes referred to as a duplex aperture to connote that the associated mounting pin may have two separate operating positions within the single opening or aperture 30. That is, referring to FIGS. 1 and 2, the aperture 30 has a left circular segment 31 and a right circular segment 32. Each of the circular segments 31, 32 opens into the other, and have equal radii so as to receive and be secured to a mounting pin (see, for example, mounting pin 35 in FIGS. 2 and 5).

As can be seen in FIG. 2, the two circular segments 31, 32 are joined at opposing points designated 38, 39. The chord, or straight line, extending between the two points 38, 39 is less than the diameter of the associated mounting pin 35. This ensures a secure engagement of the pin 35 by the associated segment of the duplex aperture, preventing the blade from sliding laterally. Moreover, it is desired that the circular segment 31 snugly receive the outer diameter of the mounting pin 35 for accuracy and for securing the blade on the hub during operation.

Other mounting apertures, such as apertures 40 and 41 shown in FIG. 1, are used to mount the blade 10 to a hub. Each of the mounting apertures 40, 41 is of a shape referred to as "obround", meaning that the left and right curved sections, designated 42 and 43 in mounting aperture 41, are each semicircular and have a radius corresponding to the radius of the circular portions 31, 32 of the duplex aperture 30. However, the circular end segments 42 and 43 of aperture 40 are joined by slightly curved sections 44 and 45 presenting a generally obround opening. This permits the mounting pin to be received in either end of the mounting aperture 40—that is, one side of mounting pin 35 engages either edge 42 or edge 43 for stability. Aperture 41 may be of a similar obround shape, or it may be a "figure 8" shape of a duplex aperture as seen in FIG. 6 and designated 48. Further, a hub may have three mounting pins or two mounting pins. Thus, the blade may have three mounting apertures with one or two of the three apertures being duplex apertures, see FIGS. 1 and 6. Alternatively, the blade may have two mounting apertures with either or both being duplex apertures. As seen in FIG. 2, the upper and lower intersections 38, 39 of the two circular segments 31, 32 of the duplex aperture 30 are pointed. These intersections may be radiused as at 50, 51 in FIG. 3 for a tighter securement of the blade, if desired.

Turning now to FIG. 4, the mounting of blades 12 and 12A on an end plate 50 is illustrated. The end plate 50 has three mounting pins 35, 35A and 35B. However, as explained above, two pins may be employed. The pins are pressed into bores machined in the plate 50, as known. The first blade 12 is mounted to all three pins, 35, 35A and 35B by means of duplex mounting aperture 30, and obround apertures 40 and 41. Blade 12 is mounted with the circular section 31 of duplex aperture 30 engaging or receiving the mounting pin 35. (It will be observed that blade 12 is turned upside down in FIG. 4 as compared to the view of this blade in FIG. 1). Next, blade 12A is attached to end plate 50 by inserting each of the three pins 35, 35A and 35B through a respective aperture in the blade, however pin 35 is inserted in the circular segment 32 of duplex aperture 30.

The centers of the duplex apertures are spaced such that by mounting alternate circular segments of the duplex aperture on the same mounting pin, and leaving the blades same side (or face side) up, the teeth are staggered with teeth being located in alternate blades approximately one-half pitch from the teeth in the next adjacent blades. This is so whether the hub is drive clockwise or counterclockwise.

The blades may be assembled to the end plate either in one stack at a time, or in one layer or rank at a time, as the operator desires and without flipping blades.

Turning now to FIG. 5, which is a view looking from the top of the stack in FIG. 4, it can be seen that the teeth of adjacent blades are staggered in the sense that the cutting edges of the teeth of one blade are offset relative to the cutting edges of the teeth in the next adjacent blade. For example, in FIG. 5, for the upper blade 12A, assuming that the blades are being rotated counter-clockwise in FIG. 5, a cutting edge of blade 12A is designated 23A, and the cutting edge of a tooth of the adjacent blade 12 is designated 23. Persons skilled in the art will understand that the same is true if the blades are rotated in a counter direction.

Having disclosed more than one embodiment of the invention, persons skilled in the art will appreciate that certain modifications may be made equivalent elements substituted for those disclosed while continuing to practice the principle of the invention. For example, the circular segments 31, 32 of the duplex aperture could be formed of small, straight segments and still engage an associated mounting pin and provide adequate coupling. Further, the teeth of the illustrated embodiment are offset by one-half the pitch of the teeth. The teeth could be offset by one-third of the pitch, or other relationship. This would require an additional coupling segment for the duplex aperture, which would become a three-position aperture. It is thus intended that all such modifications and substitutions be covered as they are embraced within the spirit and scope of the appended claims.

I claim:

1. A rasp blade adapted to be mounted to a rotary hub including at least one mounting pin extending parallel to the axis of rotation of said hub, comprising a blade body having a working edge, and including a plurality of teeth on said working edge arranged in side-by-side relation in predetermined pitch, said blade body including at least one mounting aperture having first and second portions defining first and second mounting aperture segments respectively, said aperture segments being in communicating, opposing relation, each of said first and second aperture segments extending over an included angle greater than 180°, each aperture segment further being sized to receive said mounting pin in secure mounting relation; whereby a plurality of said blades may be mounted on said mounting pin with alternate blades coupled to said pin in alternate ones of said first and second aperture segments, thereby to stagger said teeth of adjacent blades.

2. The article of claim 1 wherein said mounting aperture is a duplex aperture and each of said aperture segments is circular in form, each circular segment extending between two points such that a chord extending between said two points is less than a diameter of said mounting pin.

3. The article of claim 2 wherein centers of said radius of curvature of said first and second circular segments are spaced apart such that teeth of adjacent blades are spaced at one-half of said pitch of said teeth when adjacent blades are mounted using alternate ones of said circular segments in adjacent blades.

4. The article of claim 3 wherein said first and second portions of said duplex aperture converge at first and second opposing intersections, said intersections each including a curved nub for securing said blade to said pin to reduce lateral motion of said blade.

5. The article of claim 1 wherein said aperture is a duplex aperture and said blade body includes at least a second mounting aperture located to receive a second mounting pin.

6. The article of claim 5 wherein said second mounting aperture is elongated laterally to permit its associated mounting pin to be received in at least two different locations.

7. The article of claim 6 wherein said second mounting aperture is elongated.

8. The article of claim 5 wherein said second mounting aperture is a duplex mounting aperture having first and second portions defining first and second mounting aperture segments respectively, each sized to receive said second mounting pin in laterally displaced positions of said blade.

9. A method of assembling similar rasp blades to a hub, said hub having a mounting pin, each blade having a first side and a second side and a set of teeth spaced at predetermined pitch along a working edge of said blade;

said method comprising the steps:

providing at least one aperture in each blade, having at least first and second mounting segments in communication with each other to define a single opening wherein each mounting segment extends over an included angle greater than 180°, each mounting segment being sized and arranged to secure said blade to a mounting pin to prevent all lateral motion of said blade; and mounting a plurality of blades on said hub using alternate ones of said first and second mounting segments of said aperture for adjacent blades, thereby to stagger the teeth of adjacent blades when mounted.

10. The method of claim 9 further comprising mounting all of said blades with said first side of each blade facing the same direction.

* * * * *